(12) United States Patent
Friesen et al.

(10) Patent No.: US 10,300,443 B2
(45) Date of Patent: *May 28, 2019

(54) SPRAY-DRYING PROCESS

(71) Applicant: Bend Research, Inc., Bend, OR (US)

(72) Inventors: Dwayne T. Friesen, Bend, OR (US); David D. Newbold, Bend, OR (US); John M. Baumann, Bend, OR (US); Devon B. DuBose, Bend, OR (US); Douglas L. Millard, Bend, OR (US)

(73) Assignee: Bend Research, Inc., Bend, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 15/670,757

(22) Filed: Aug. 7, 2017

(65) Prior Publication Data

US 2017/0333861 A1 Nov. 23, 2017

Related U.S. Application Data

(63) Continuation of application No. 13/259,082, filed as application No. PCT/US2010/027930 on Mar. 19, 2010, now Pat. No. 9,724,664.

(Continued)

(51) Int. Cl.
*B01J 2/02* (2006.01)
*B01J 2/04* (2006.01)
(Continued)

(52) U.S. Cl.
CPC .................................... *B01J 2/04* (2013.01)

(58) Field of Classification Search
None
See application file for complete search history.

(56) References Cited

U.S. PATENT DOCUMENTS

| 2,460,546 A | 2/1949 | Stephanoff |
| 2,937,091 A | 5/1960 | Rosenberg |

(Continued)

FOREIGN PATENT DOCUMENTS

| DE | 3229843 A1 | 3/1983 |
| EP | 0113967 A2 | 7/1984 |

(Continued)

OTHER PUBLICATIONS

US 5,849,884 A, 12/1998, Woiszwillo et al. (withdrawn)
(Continued)

*Primary Examiner* — Ernst V Arnold
*Assistant Examiner* — Kyung S Chang
(74) *Attorney, Agent, or Firm* — Klarquist Sparkman, LLP

(57) ABSTRACT

The process comprises delivering a spray solution comprising an active agent and a matrix material in an organic solvent to a spray-drying apparatus, atomizing the spray solution into droplets within the spray-drying apparatus to remove at least a portion of the organic solvent from the droplets to form a plurality of particles, and collecting the particles. The spray solution may be formed by forming a feed suspension comprising the active agent, the matrix material, and the organic solvent, wherein the feed suspension is at a temperature $T_1$, and directing the feed suspension to a heat exchanger, thereby increasing the temperature of the feed suspension to a temperature $T_2$, wherein $T_2$ is greater than $T_1$, and the spray solution is at a pressure greater than the vapor pressure of the organic solvent at $T_2$, such that the active agent and matrix material are soluble in the organic solvent at $T_2$.

18 Claims, 2 Drawing Sheets

Related U.S. Application Data

(60) Provisional application No. 61/164,353, filed on Mar. 27, 2009.

(51) Int. Cl.
    *B01J 2/00*     (2006.01)
    *B01J 2/16*     (2006.01)

(56) References Cited

U.S. PATENT DOCUMENTS

| | | |
|---|---|---|
| 3,557,864 A | 1/1971 | Berg |
| 3,621,902 A | 11/1971 | Okada et al. |
| 3,673,106 A | 6/1972 | Jonas et al. |
| 3,922,189 A | 11/1975 | Penders |
| 3,990,938 A | 11/1976 | Whitehouse |
| 4,019,958 A | 4/1977 | Hell et al. |
| 4,089,120 A | 5/1978 | Kozischek |
| 4,201,756 A | 5/1980 | Saeman et al. |
| 4,209,912 A | 7/1980 | Barker |
| 5,013,557 A | 5/1991 | Tai |
| 5,039,532 A | 8/1991 | Jost et al. |
| 5,135,611 A | 8/1992 | Cameron |
| 6,165,506 A | 12/2000 | Jain et al. |
| RE37,053 E | 2/2001 | Hanes et al. |
| 6,303,148 B1 | 10/2001 | Hennink et al. |
| 6,395,302 B1 | 5/2002 | Hennink et al. |
| 6,406,735 B2 | 6/2002 | Stein et al. |
| 6,497,903 B1 | 12/2002 | Hennink et al. |
| 6,589,557 B2 | 7/2003 | Straub et al. |
| 6,589,562 B1 | 7/2003 | Shefer et al. |
| 6,610,317 B2 | 8/2003 | Straub et al. |
| 6,740,310 B2 | 5/2004 | Edwards et al. |
| 6,740,631 B2 | 5/2004 | Shefer et al. |
| 6,800,297 B2 | 10/2004 | Altreuter et al. |
| 6,835,389 B1 | 12/2004 | Dohi et al. |
| 6,932,983 B1 | 8/2005 | Straub et al. |
| 6,942,868 B2 | 9/2005 | Edwards et al. |
| 6,977,087 B2 | 12/2005 | Edwards et al. |
| 6,998,393 B2 | 2/2006 | Jin et al. |
| 7,018,657 B2 | 3/2006 | Dickinson et al. |
| 7,060,296 B2 | 6/2006 | Hennink et al. |
| 7,078,057 B2 | 7/2006 | Kerkhof |
| 7,300,919 B2 | 11/2007 | Patton |
| 7,323,441 B2 | 1/2008 | Morazzoni et al. |
| 7,378,110 B2 | 5/2008 | Truong-Le et al. |
| 7,404,828 B1 | 7/2008 | Nicola |
| 7,521,069 B2 | 4/2009 | Patton et al. |
| 7,682,635 B2 | 3/2010 | Gref et al. |
| 7,780,988 B2 | 8/2010 | Beyerinck et al. |
| 7,928,089 B2 | 4/2011 | Morton et al. |
| 8,343,550 B2 | 1/2013 | Beyerinck et al. |
| 8,402,672 B2 | 3/2013 | Nielsen |
| 2002/0031547 A1 | 3/2002 | Takagi et al. |
| 2002/0146509 A1 | 10/2002 | Kodokian et al. |
| 2003/0104076 A1 | 6/2003 | Berkulin et al. |
| 2003/0124193 A1 | 7/2003 | Snyder et al. |
| 2003/0166509 A1 | 9/2003 | Edwards et al. |
| 2003/0185893 A1 | 10/2003 | Beyerinck et al. |
| 2003/0207776 A1 | 11/2003 | Shefer et al. |
| 2003/0215515 A1 | 11/2003 | Truong-Le et al. |
| 2004/0006276 A1 | 1/2004 | Demos et al. |
| 2004/0037905 A1 | 2/2004 | Bringe |
| 2004/0062778 A1 | 4/2004 | Shefer et al. |
| 2004/0076670 A1 | 4/2004 | Klinksiek et al. |
| 2004/0091535 A1 | 5/2004 | Vachon et al. |
| 2004/0092470 A1 | 5/2004 | Leonard et al. |
| 2004/0109894 A1 | 6/2004 | Shefer et al. |
| 2004/0145069 A1 | 7/2004 | Low |
| 2004/0176391 A1 | 9/2004 | Weers et al. |
| 2004/0184995 A1 | 9/2004 | Katsuma et al. |
| 2004/0191186 A1 | 9/2004 | Edwards et al. |
| 2004/0224019 A1 | 11/2004 | Shefer et al. |
| 2004/0234597 A1 | 11/2004 | Shefer et al. |
| 2005/0019270 A1 | 1/2005 | Finlay et al. |
| 2005/0031692 A1 | 2/2005 | Beyerinck et al. |
| 2005/0037996 A1 | 2/2005 | Beck et al. |
| 2005/0058710 A1 | 3/2005 | Straub et al. |
| 2005/0065047 A1 | 3/2005 | Shefer et al. |
| 2005/0112235 A1 | 5/2005 | Shefer et al. |
| 2005/0118208 A1 | 6/2005 | Bewert et al. |
| 2005/0158249 A1 | 7/2005 | Edwards et al. |
| 2005/0191246 A1 | 9/2005 | Bechtold-Peters et al. |
| 2006/0039987 A1 | 2/2006 | Batycky et al. |
| 2006/0068019 A1 | 3/2006 | Dalziel et al. |
| 2006/0093557 A1 | 5/2006 | Dickinson et al. |
| 2006/0121121 A1 | 6/2006 | Jin et al. |
| 2006/0127480 A1 | 6/2006 | Tobyn et al. |
| 2006/0141029 A1 | 6/2006 | Heller et al. |
| 2006/0141047 A1 | 6/2006 | Heller et al. |
| 2006/0142185 A1 | 6/2006 | Morazzoni et al. |
| 2006/0153912 A1 | 7/2006 | Habich et al. |
| 2006/0159625 A1 | 7/2006 | Tarara et al. |
| 2006/0165785 A1 | 7/2006 | Noga et al. |
| 2006/0210640 A1 | 9/2006 | Kerkhof |
| 2006/0257491 A1 | 11/2006 | Morton et al. |
| 2006/0263454 A1 | 11/2006 | Sugiyama et al. |
| 2006/0280691 A1 | 12/2006 | Wang et al. |
| 2006/0292081 A1 | 12/2006 | Morton et al. |
| 2007/0020197 A1 | 1/2007 | Galli et al. |
| 2007/0031490 A1 | 2/2007 | Loebenberg et al. |
| 2007/0042021 A1 | 2/2007 | Schiffrin et al. |
| 2007/0043030 A1 | 2/2007 | Morton et al. |
| 2007/0045100 A1 | 3/2007 | Wright |
| 2007/0134341 A1 | 6/2007 | Kipp et al. |
| 2007/0148236 A1 | 6/2007 | Babcock et al. |
| 2007/0166386 A1 | 7/2007 | Chinea et al. |
| 2007/0189979 A1 | 8/2007 | Zeng et al. |
| 2008/0057003 A1 | 3/2008 | Bechtold-Peters et al. |
| 2008/0124349 A1 | 5/2008 | Engstad et al. |
| 2008/0131514 A1 | 6/2008 | Truong-Le et al. |
| 2008/0181962 A1 | 7/2008 | Brzeczko et al. |
| 2008/0207476 A1 | 8/2008 | Artiga Gonzalez et al. |
| 2008/0229609 A1 | 9/2008 | Bronshtein |
| 2008/0248117 A1 | 10/2008 | Kolter et al. |
| 2008/0292707 A1 | 11/2008 | Babcock et al. |
| 2009/0011031 A1 | 1/2009 | Staniforth et al. |
| 2009/0038612 A1 | 2/2009 | Nilsson et al. |
| 2009/0269411 A1 | 10/2009 | Bellinghausen et al. |
| 2009/0270308 A1 | 10/2009 | Libin et al. |
| 2009/0285905 A1 | 11/2009 | Gordon et al. |

FOREIGN PATENT DOCUMENTS

| | | |
|---|---|---|
| EP | 0380219 A2 | 8/1990 |
| EP | 0405598 A2 | 1/1991 |
| EP | 0421581 A1 | 4/1991 |
| EP | 0421582 A1 | 4/1991 |
| EP | 0807431 A2 | 11/1997 |
| EP | 1239844 A1 | 9/2002 |
| EP | 1506996 A2 | 2/2005 |
| EP | 1552815 A1 | 7/2005 |
| EP | 1552817 A1 | 7/2005 |
| EP | 1741424 A2 | 1/2007 |
| EP | 1844758 A1 | 10/2007 |
| GB | 918168 A | 2/1963 |
| GB | 1305598 A | 2/1973 |
| GB | 2132495 A | 7/1984 |
| WO | WO1991/012074 A1 | 8/1991 |
| WO | WO1997/044013 A1 | 11/1997 |
| WO | WO1998/031346 A1 | 7/1998 |
| WO | WO2000/013672 A1 | 3/2000 |
| WO | WO2000/072827 A2 | 12/2000 |
| WO | WO2001/045674 A1 | 6/2001 |
| WO | WO2001/045677 A1 | 6/2001 |
| WO | WO2001/078689 A2 | 10/2001 |
| WO | WO2001/095877 A2 | 12/2001 |
| WO | WO2002/024169 A1 | 3/2002 |
| WO | WO2002/045575 A2 | 6/2002 |
| WO | WO2002/083154 A1 | 10/2002 |
| WO | WO2003/043586 A2 | 5/2003 |
| WO | WO2003/092659 A1 | 11/2003 |
| WO | WO2003/105780 A2 | 12/2003 |
| WO | WO2004/006897 A1 | 1/2004 |
| WO | WO2004/012690 A1 | 2/2004 |

(56) References Cited

FOREIGN PATENT DOCUMENTS

| | | |
|---|---|---|
| WO | WO2004/030659 A1 | 4/2004 |
| WO | WO2004/039960 A2 | 5/2004 |
| WO | WO2004/041991 A1 | 5/2004 |
| WO | WO2004/060351 A2 | 7/2004 |
| WO | WO2004/071521 A1 | 8/2004 |
| WO | WO2004/082660 A1 | 9/2004 |
| WO | WO2004/112695 A2 | 12/2004 |
| WO | WO2004/112696 A2 | 12/2004 |
| WO | WO2005/007080 A2 | 1/2005 |
| WO | WO2005/011636 A2 | 2/2005 |
| WO | WO2005/025541 A2 | 3/2005 |
| WO | WO2005/025550 A1 | 3/2005 |
| WO | WO2005/055976 A2 | 6/2005 |
| WO | WO2005/084644 A1 | 9/2005 |
| WO | WO2005/115330 A2 | 12/2005 |
| WO | WO2005/117962 A1 | 12/2005 |
| WO | WO2006/003504 A1 | 1/2006 |
| WO | WO2006/036617 A1 | 4/2006 |
| WO | WO2007/027918 A2 | 3/2007 |
| WO | WO2008/011086 A1 | 1/2008 |
| WO | WO2008/092057 A2 | 7/2008 |
| WO | WO2008/101173 A2 | 8/2008 |
| WO | WO2009/046440 A1 | 4/2009 |
| WO | WO2010/102066 A1 | 9/2010 |
| WO | WO2010/132827 A1 | 11/2010 |

OTHER PUBLICATIONS

Chemicalland21 (http://www.chemicalland21.com/industrialchem/solalc/ETHYL%20ACETATE.htm) searched on Apr. 20, 2013.

Communication pursuant to Article 94(3) EPC, dated Feb. 19, 2015, issued in related EP Application No. 10 712 212.9, 6 pages.

Communication under Rule 71(3) EPC—Intention to Grant, dated Jun. 13, 2016 for European Patent Application No. 10712212.9, 8 pages.

European Patent Office, Summons to Attend Oral Proceedings Pursuant to Rule 115(1) EPC, dated Oct. 15, 2015, issued in corresponding European Patent Application No. 10712212.9, 6 pages.

European Patent Office, Brief Communication, dated Mar. 31, 2016, issued in corresponding European Patent Application No. 10712212.9, 6 pages.

Grenha et al., "Microencapsulated chitosan nanoparticles for lung protein delivery," *European Journal of Pharmaceutical Sciences*, vol. 25, Issues 4-5, pp. 427-437 (Jul.-Aug. 2005).

International Search Report and Written Opinion of the International Searching Authority, dated Feb. 17, 2012, issued in related International Application No. PCT/US2011/052819, 9 pages.

International Search Report and Written Opinion, dated Feb. 24, 2012, issued in related International Application No. PCT/US2011/050222, 12 pages.

Kawashima et al., "A New Powder Design Method to Improve Inhalation Efficiency of Pranlukast Hydrate Dry Powder Aerosols by Surface Modification with Hydroxypropylmethylcellulose Phthalate Nanospheres," *Pharmaceutical Research*, vol. 15, No. 11, pp. 1748-1752 (Nov. 1998).

Notice of Allowance from the United States Patent & Trademark Office, dated Apr. 5, 2017, in U.S. Appl. No. 13/259,082.

Office Action from the United States Patent & Trademark Office, dated Apr. 26, 2013, in U.S. Appl. No. 13/259,082.

Office Action from the United States Patent & Trademark Office, dated Nov. 7, 2013, in U.S. Appl. No. 13/259,082.

Office Action from the United States Patent & Trademark Office, dated Sep. 3, 2014, in U.S. Appl. No. 13/259,082.

Office Action from the United States Patent & Trademark Office, dated Feb. 10, 2015, in U.S. Appl. No. 13/259,082.

Office Action from the United States Patent & Trademark Office, dated Jun. 30, 2015, in U.S. Appl. No. 13/259,082.

Office Action from the United States Patent & Trademark Office, dated Jan. 6, 2016, in U.S. Appl. No. 13/259,082.

Office Action from the United States Patent & Trademark Office, dated Jun. 30, 2016, in U.S. Appl. No. 13/259,082.

Office Action from the United States Patent & Trademark Office, dated Jan. 25, 2017, in U.S. Appl. No. 13/259,082.

Rasenack et al., "Micronization of Anti-Inflammatory Drugs for Pulmonary Delivery by a Controlled Crystallization Process," *Journal of Pharmaceutical Sciences*, vol. 92, No. 1, pp. 35-44 (Jan. 2003).

Sarkari et al., "Enhanced drug dissolution using evaporative precipitation into aqueous solution," *International Journal of Pharmaceutics*, 243, pp. 17-31 (2002).

Sham et al., "Formulation and characterization of spray-dried powders containing nanoparticles for aerosol delivery to the lung," *International Journal of Pharmaceutics*, vol. 269, Issue 2, pp. 457-467 (Jan. 2004).

Snyder, Herman E., "Streamlining Spray Drying Process Design for Pulmonary Dry Powder Product Development: Application of Computational Fluid Dynamics to Aid System Scale-Up," *Respiratory Drug Delivery*, 2008, pp. 207-215.

Steckel et al., "In-situ-micronization of disodium cromoglycate for pulmonary delivery," *European Journal of Pharmaceutics and Biopharmaceutics*, vol. 55, No. 2, pp. 173-180 (Mar. 2003).

Steckel et al., "In vitro characterization of jet-milled and in-situ-micronized fluticasone-17-propionate," *International Journal of Pharmaceutics*, vol. 258, Issues 1-2, pp. 65-75 (Jun. 2003).

The product book, "Ezetimibe": [retrieved on Aug. 23, 2014 from the website http://www.scbt.com/datasheet-205690-ezetimibe.html].

Wikipedia, "Spray Nozzle": [retrieved from on line website: https://en.wikipedia.org/wiki/Spray_Nozzle, last visit Jun. 23, 2015].

SPRAY-DRYING PROCESS

CROSS REFERENCE TO RELATED APPLICATIONS

This is a continuation of application Ser. No. 13/259,082, filed Sep. 22, 2011, now U.S. Pat. No. 9,724,664, which is the U.S. National Stage of International Application No. PCT/US2010/027930, filed Mar. 19, 2010, which was published in English under PCT Article 21(2), which in turn claims the benefit of U.S. Provisional Application No. 61/164,353, filed Mar. 27, 2009, each of which is incorporated herein in its entirety by reference.

BACKGROUND

A novel spray-drying process is disclosed. The process can lead to spray-dried products with improved properties, as well as increased throughput relative to conventional spray-drying processes.

The use of spray drying to produce powders from fluid feed stocks is well known, with applications ranging from powdered milk to bulk chemicals and pharmaceuticals. See U.S. Pat. No. 4,187,617 and Mujumbar et al., *Drying 91*, pages 56-73 (1991). See also Masters, *Spray Drying Handbook*, pages 263-268 (4th edition, 1985). The use of spray drying to form solid amorphous dispersions of drugs or active agents and concentration-enhancing polymers is also known. See commonly owned U.S. Pat. Nos. 6,763,607 and 6,973,741.

When it is desired to form a spray-dried product in which the drug or active agent is amorphous, it is desirable to have the active agent fully dissolved in the spray solution when it is atomized into droplets. Specifically, when it is desired to form a spray-dried product in which the amorphous active agent is dispersed in one or more other materials, termed matrix material, it is generally desired to have at least a part and often all of the matrix material also dissolved in the spray solution. In such cases, the throughput of a conventional spray-drying process is often limited by the amount of active agent and matrix material that can be dissolved in the spray solution. It is generally known that the solubility of many substances, such as active agents and matrix materials, often increases as the temperature of the solvent is increased. However, industry avoids using elevated temperatures when using organic solvents, due to the inherent dangers and safety concerns when processing organic solvents, which are often flammable at high temperatures. In addition, conventional spray-drying processes avoid use of elevated temperatures out of concern for the thermal stability of the active agent and matrix material-degradation of the active agent and/or the matrix material can lead to unwanted breakdown products in the particles produced.

Because of this, conventional spray-drying solutions are generally kept at or near room temperature when entering the spray nozzle. This limits the throughput of the process due to the often low solubility of active agents and matrix materials in the solvents used. In addition, when the solubility of the active agent in the spray solution is low, the active agent is often dissolved to near its solubility limit to achieve as high a throughput as possible. The spray-dried products obtained from such solutions are often not homogeneous. Finally, conventional spray-dried processes often produce products that suffer from not being homogeneous because the rate of solvent removal is not sufficiently fast, and broad ranges of particle sizes are produced because the atomization means produces a wide range of droplet sizes.

U.S. Patent Application Publication No. 2008/0248114A1 describes the production of solid solutions containing poorly-soluble active substances using a spray-drying process utilizing short-term heating and rapid drying. The process avoids organic solvents by utilizing a feed stream that is an aqueous suspension of the active. The aqueous suspension is heated to allow dissolution of the active in the spray solution. However, this process is limited to actives that have a high solubility in water at elevated temperature.

What is needed is a spray-drying process that results in improved properties of the spray-dried product, such as a higher degree of homogeneity and more uniform particle size, and that improves the throughput of spray-drying equipment while spraying solutions of an active agent and the matrix material, and provides a safe, reproducible process to produce high-quality product. Such a process promises to increase the quality and decrease manufacturing costs for spray-dried products.

SUMMARY

A process for increasing the throughput of a spray drier comprises (a) delivering a spray solution comprising an active agent and a matrix material in an organic solvent to a spray-drying apparatus, (b) atomizing the spray solution into droplets within the spray-drying apparatus to remove at least a portion of the organic solvent from the droplets to form a plurality of particles, and (c) collecting the particles. The spray solution is formed by forming a feed suspension comprising the active agent, the matrix material, and the organic solvent, wherein the feed suspension is at a temperature $T_1$, and directing the feed suspension to a heat exchanger, thereby increasing the temperature of the feed suspension to a temperature $T_2$, wherein (i) temperature $T_2$ is greater than temperature $T_1$, and (ii) the spray solution is at a pressure that is greater than the vapor pressure of the solvent at temperature $T_2$, such that substantially all of the active agent in the spray solution and at least a portion of the matrix material are soluble in the solvent at temperature $T_2$.

In one embodiment, temperature $T_2$ is greater than the ambient-pressure boiling point of the organic solvent.

In another embodiment, the nozzle used for atomization of the spray solution is a pressure nozzle. In another embodiment, the nozzle used for atomization of the spray solution in the spray-drying apparatus is a flash nozzle. A flash nozzle utilizes a pressure drop that induces cavitation in the spray solution prior to exiting the nozzle orifice to induce droplet formation. A sweep gas around the orifice is used to eliminate or reduce solids build-up during operation.

In another aspect, the matrix material comprises a polymer.

In still another aspect, the particles comprise a solid amorphous dispersion of the active agent and a polymer.

The disclosed processes provide one or more advantages over a conventional spray-drying process. Certain embodiments of the disclosed processes can increase the throughput of a spray dryer by forming a spray solution that has a higher concentration at a higher temperature than conventional processes. Additionally, certain embodiments of the disclosed processes allow spray-drying solutions wherein ratio of the concentration of active agent in the spray solution to the solubility of the active agent in the organic solvent at the atomization temperature is significantly less than one, preferably less than 0.5, and even more preferably less than 0.3. Operating in this regime generally leads to spray-dried products that are more homogeneous and more uniform. In addition, the disclosed processes result in rapid evaporation of the organic solvent, and shorter times to solidification than conventional processes. Furthermore, in some embodiments, the process results in improved atomization of the spray solution relative to conventional processes due to the temperature of the spray solution when it is atomized being above the boiling point of the solvent at the pressure of the drying chamber.

DETAILED DESCRIPTION

A spray-drying process for producing a composition comprising an active agent and a matrix material is described. The spray-drying process, suitable apparatus for carrying out the process, and suitable active agents and matrix materials are described in detail below.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

Spray-Drying Process

The term spray drying is used conventionally and broadly refers to processes involving breaking up liquid mixtures into small droplets (atomization) and rapidly removing solvent from the mixture in a container (drying chamber) where there is a strong driving force for evaporation of solvent from the droplets. The strong driving force for solvent evaporation is generally provided by maintaining the partial pressure of solvent in the spray-drying apparatus well below the vapor pressure of the solvent at the temperature of the drying droplets. This is accomplished by (1) mixing the liquid droplets with a warm drying gas, (2) maintaining the pressure in the spray-drying apparatus at a partial vacuum (e.g., 0.01 atm to 0.50 atm), or (3) both.

Generally, the temperature and flow rate of the drying gas is chosen so that the droplets of spray solution are dry enough by the time they reach the wall of the apparatus that they are essentially solid, form a fine powder, and do not stick to the apparatus wall. The actual length of time to achieve this level of dryness depends on the size of the droplets and the conditions at which the process is operated. Droplet sizes may range from 1 μm to 500 μm in diameter, the size being dependent on the desired particle size of the spray dried powder. The large surface-to-volume ratio of the droplets and the large driving force for evaporation of solvent lead to actual drying times of a few seconds or less, and often less than 0.1 second. Solidification times should be less than 100 seconds, and often less than a few seconds.

Figure 1:
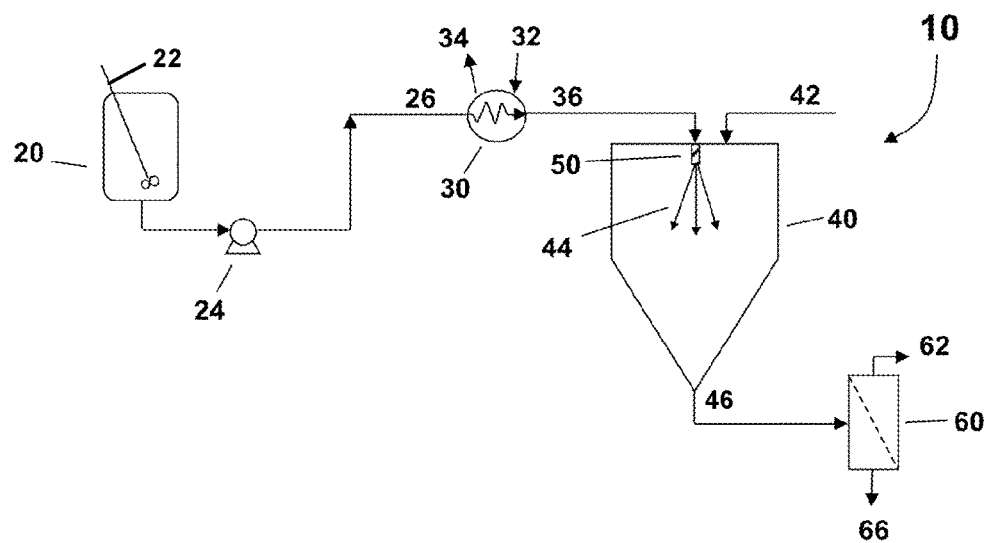
FIG. 1 is a schematic of a spray-drying apparatus suitable for use in performing the process of the invention.

Turning to the drawings, wherein the same numerals refer to like elements, there is shown in FIG. 1 an apparatus 10 suitable for performing embodiments of the disclosed processes. In the following discussion it is assumed that the spray-drying apparatus is cylindrical. However, the dryer may take any other cross-sectional shape suitable for spray drying a spray solution, including square, rectangular, and octagonal, among others. The spray-drying apparatus is also depicted as having one nozzle. However, multiple nozzles can be included in the spray-drying apparatus to achieve higher throughput of the spray solution.

The apparatus shown in FIG. 1 includes a feed suspension tank 20, a heat exchanger 30, a drying chamber 40, a nozzle 50, and a particle-collection means 60. In one embodiment, the process is performed as follows. An active agent and a matrix material are combined with an organic solvent in the feed suspension tank 20 to form a feed suspension. The feed suspension is at a temperature $T_1$, which is below the ambient-pressure boiling point of the organic solvent. Temperature $T_1$ is also below either $T_A$, the temperature at which the active agent solubility equals the active agent concentration in the organic solvent, or $T_M$, the temperature at which the matrix material solubility equals the matrix material concentration in the organic solvent. At least a portion of the active agent, a portion of the matrix material, or a portion of both the active agent and the matrix material are suspended, that is not dissolved, in the organic solvent. An optional mixing means 22 may be used to keep the feed suspension homogeneous while processing. When the organic solvent is flammable, oxygen is normally excluded from all parts of the drying apparatus. In particular, an inert gas, such as nitrogen, helium, argon, and the like, is often used to fill the void space in the feed suspension tank for safety reasons.

As used herein, the term "feed suspension" means a composition comprising an active agent, a matrix material, and an organic solvent, wherein at least a portion of the active agent, a portion of the matrix material, or a portion of both active agent and matrix material are suspended or not dissolved in the organic solvent. In one embodiment, the feed suspension consists essentially of an active agent, a matrix material, and an organic solvent. In still another embodiment, the feed suspension consists of an active agent, a matrix material, and an organic solvent. In yet another embodiment, the feed suspension consists of particles of active agent suspended in a solution of matrix material dissolved in the organic solvent. It will be recognized that in such feed suspensions, a portion of the active agent and the matrix material may dissolve up to their solubility limits at the temperature of the feed suspension.

As used herein, the term "organic solvent" means an organic compound that can be used to dissolve the active agent and the matrix material at elevated temperature. In one embodiment, the solvent is volatile, having an ambient-pressure boiling point of 150° C. or less. In another embodiment, the solvent has an ambient-pressure boiling point of 100° C. or less. Suitable solvents include alcohols such as methanol, ethanol, n-propanol, isopropanol, and butanol; ketones such as acetone, methyl ethyl ketone and methyl isobutyl ketone; esters such as ethyl acetate and propyl acetate; and various other solvents, such as tetrahydrofuran, acetonitrile, methylene chloride, toluene, and 1,1,1-trichloroethane. Lower volatility solvents such as dimethylacetamide or dimethylsulfoxide can also be used, generally in combination with a volatile solvent. Mixtures of solvents, such as 50% methanol and 50% acetone, can also be used, as can mixtures with water. In one embodiment, the organic solvent contains less than 50 wt % water. In another embodiment, the organic solvent contains less than 25 wt % water. In still another embodiment, the organic solvent contains less than 10 wt % water. In yet another embodiment, the organic solvent contains less than 5 wt % water. In another embodiment, the organic solvent contains essentially no water.

For convenience, the feed suspension is often maintained at near-ambient temperatures; however, this is not a limitation of the disclosed processes. Generally, the temperature of the feed suspension, $T_1$, can range from 0° C. to 50° C. or even higher. Temperatures of less than 0° C. may also be utilized, especially when there are stability concerns about the active agent.

The feed suspension in the feed suspension tank 20 is delivered to a pump 24, which directs the feed suspension to a heat exchanger 30. The heat exchanger has a feed suspension inlet 26, a spray solution outlet 36, a heating fluid inlet 32, and a heating fluid outlet 34. In the heat exchanger 30, the feed suspension enters through the feed suspension inlet 26 at temperature $T_1$, and exits as the spray solution through the spray solution outlet 36 at temperature $T_2$. Spray solution temperature $T_2$ is greater than feed suspension temperature $T_1$. To prevent unwanted vaporization/boiling of the organic solvent in the spray solution, pump 24 increases the pressure of the spray solution such that the pressure of the spray solution at spray solution outlet 36 is greater than the vapor pressure of the organic solvent at temperature $T_2$. The temperature of the spray solution when it enters the nozzle 50 is generally near $T_2$. Preferably it is within 30° C. of temperature $T_2$. In addition, $T_2$ is greater than or equal to the lesser of $T_A$ and $T_M$. In one embodiment, $T_2$ is greater than or equal to the greater of $T_A$ and $T_M$. When it is the object of the process to form a solid amorphous dispersion of the active agent and the matrix material, $T_2$ is greater than or equal to $T_A$. Preferably, $T_2$ is at least 10° C. greater than $T_A$. In one embodiment, the spray solution temperature $T_2$ is greater than the ambient-pressure boiling point of the organic solvent.

The spray solution exiting the heat exchanger may be at any temperature, $T_2$, which is greater than $T_1$, as long as $T_2$ is greater than or equal to the lesser of $T_A$ and $T_M$. Temperature $T_2$ may be at least 10° C. greater than $T_1$, at least 20° C. greater than $T_1$, at least 30° C. greater than $T_1$, at least 40° C. greater than $T_1$, or even at least 50° C. greater than $T_1$. In one embodiment, temperature $T_2$ is at least 50° C. In another embodiment, temperature $T_2$ is at least 70° C. In another embodiment, temperature $T_2$ is at least 80° C. In another embodiment, temperature $T_2$ is at least 90° C. In another embodiment, $T_2$ is at least 100° C. In still another embodiment, $T_2$ is at least 120° C.

The active agent and the matrix material are both soluble in the organic solvent at temperature $T_2$. By "soluble" is meant that essentially all of the active agent and matrix material are dissolved in the organic solvent at temperature $T_2$. In the case of the active agent, the term "dissolved" has the conventional meaning, indicating that the active agent has gone into solution. In the case of matrix materials, the term "dissolved" can take a broader definition. For some matrix materials, such as polymers, the term dissolved can mean the polymer has gone into solution, or it can mean the polymer is dispersed or highly swollen with the organic solvent such that it acts as if it were in solution. In contrast, at temperature $T_1$, at least one of the active agent and the matrix material are present as a suspension in the organic solvent. Any suitable technique may be used to determine if the active agent and matrix material are soluble in the organic solvent at temperature $T_2$. Examples include dynamic or static light scattering analysis, turbidity analysis, and visual observations. In one embodiment, the spray solution comprises the active agent and the matrix material dissolved in the organic solvent at temperature $T_2$.

In one embodiment, temperature $T_2$ is greater than the temperature at which the active agent and matrix material are soluble in the organic solvent. That is, $T_2$ is greater than or equal to the greater of $T_A$ and $T_M$. It may be desirable that temperature $T_2$ be much greater than the greater of $T_A$ and $T_M$. Thus, temperature $T_2$ may be at least 10° C. greater than the greater of $T_A$ and $T_M$, at least 20° C. greater than the greater of $T_A$ and $T_M$, or even at least 30° C. greater than the greater of $T_A$ and $T_M$. Spray-dried products made by embodiments of the disclosed processes are typically more uniform and homogeneous when temperature $T_2$ is greater than the greater of $T_A$ and $T_M$.

In one embodiment, the pump 24 increases the pressure of the spray solution to a pressure ranging from 2 atm to 400 atm. In another embodiment, the pressure of the spray solution as it exits the heat exchanger 30 is greater than 10 atm.

The heat exchanger 30 may be of any design wherein heat is transferred to the feed suspension resulting in an increase in temperature. In one embodiment, the heat exchanger 30 is an indirect heat exchanger, wherein a heating fluid is in contact with the feed suspension through a heat-transfer surface. Exemplary indirect heat exchangers include tube-in-tube devices and tube-in-shell devices, both well-known in the art. The heat exchanger 30 may also be a direct heat exchanger, in which a heating fluid, such as steam, is injected directly into the feed suspension, resulting in an increase in the temperature of the feed suspension. In yet another embodiment, the feed suspension flows over a hot surface, such as a resistance heating element, resulting in an increase in temperature of the feed suspension. Other heating sources may also be used, such as microwaves and ultrasonic devices that can increase the temperature of the feed suspension.

The concentration of active agent and matrix material in the spray solution can be virtually any value. In one embodiment, the concentration of total solids (that is, active agent and matrix material) in the organic solvent is at least 0.5 wt %. The concentration of total solids in the organic solvent may be at least 1 wt %, at least 5 wt %, or even at least 10 wt % or more. In another embodiment, the concentration of active agent in the organic solvent is at least 1.25-fold the solubility of the active agent in the organic solvent at temperature $T_1$. The concentration of active agent in the organic solvent may be at least 1.5-fold, at least 2.0-fold, or even 2.5-fold or more the solubility of the active agent in the organic solvent at temperature $T_1$.

In one embodiment, the residence time of the feed suspension in the heat exchanger 30 is minimized so as to limit the time the suspension/solution is exposed to elevated temperatures. The residence time of the suspension/solution in the heat exchanger may be less than 30 minutes, less than 20 minutes, less than 10 minutes, less than 5 minutes, or even less than 1 minute.

The spray solution at the spray solution outlet 36 is directed to a drying chamber 40, where it enters a nozzle 50 for atomizing the spray solution into droplets 44. The temperature of the spray solution when it enters the nozzle 50 is the spray temperature, designated as $T_3$. When it is desired to keep the active agent and matrix material dissolved in the spray solution, it is often desirable for $T_3$ to be at or near $T_2$. However, there are sometimes advantages to having $T_3$ significantly less than $T_2$. For example, degradation of the active agent may be reduced or atomization in certain nozzles may be more effective when $T_3$ is significantly less than $T_2$. In some cases, it is even desirable for $T_3$ to be sufficiently low that the active agent, the matrix material, or both the active agent and the matrix material are not soluble in the solvent. In such cases, the solution may be below the point at which the solutes are soluble for a sufficiently short time such that all the solutes remain in solution until the solution is atomized. Alternatively, the solution may be below the point at which the solutes are soluble for a sufficiently long time that one or more of the matrix material or the active agent may precipitate or crystallize from solution. In one embodiment, temperature $T_3$ is less than 5° C. less than $T_2$. In another embodiment, temperature $T_3$ is less than 20° C. less than $T_2$. In another embodiment, temperature $T_3$ is less than 50° C. less than $T_2$. In still another embodiment, both temperatures $T_2$ and $T_3$ are greater than the greater of $T_A$ and $T_M$. In one embodiment, temperatures $T_2$ and $T_3$ are at least 5° C. greater than the greater of $T_A$ and $T_M$. In another embodiment, temperatures $T_2$ and $T_3$ are at least 20° C. greater than the greater of $T_A$ and $T_M$. In yet another embodiment, temperatures $T_2$ and $T_3$ are at least 50° C. greater than the greater of $T_A$ and $T_M$.

In one embodiment, the apparatus 10 is designed such that the time the spray solution is at a temperature greater than $T_3$ is minimized. This may be accomplished by locating the spray solution outlet 36 as close as possible to the nozzle 50. Alternatively, the size of the tubing or fluid connections between the spray solution outlet 36 and the nozzle 50 may be small, minimizing the volume of spray solution and reducing the time the spray solution is at a temperature greater than $T_3$. The time the spray solution is at a temperature greater than $T_3$ may be less than 30 minutes, less than 20 minutes, less than 10 minutes, less than 5 minutes, or even less than 1 minute.

Virtually any nozzle can be used to atomize the spray solution into droplets. The inventors have found that pressure nozzles are effective in embodiments of the disclosed processes. In another embodiment, a flash nozzle is used, as described below.

The drying chamber 40 also has a source of heated drying gas 42 which is combined with the droplets 44 in the drying chamber 40. In the drying chamber 40, at least a portion of the solvent is removed from the droplets to form a plurality of particles comprising the active agent and the matrix material. Generally, it is desired that the droplets are sufficiently dry by the time they come in contact with the drying chamber surface that they do not stick or coat the chamber surfaces.

The particles, along with the evaporated solvent and drying gas, exit the drying chamber at outlet 46, and are directed to a particle-collection means 60. Suitable particle-collection means include cyclones, filters, electrostatic particle collectors, and the like. In the particle-collection means 60, the evaporated solvent and drying gas 62 are separated from the plurality of particles 66, allowing for collection of the particles.

The particles may be of any desired size. In one embodiment, the particles have an average diameter ranging from 0.5 µm to 500 µm. In another embodiment, the particles have a diameter ranging from 0.5 µm to 100 µm. In another embodiment, the particles have an average diameter of greater than 10 µm. In still another embodiment, the particles have an average diameter of greater than 20 µm. In still another embodiment, the particles have an average diameter of greater than 30 µm. In yet another embodiment, the particles have a mass median aerodynamic diameter ranging from 0.5 µm to 10 µm. In still another embodiment, the particles have a mass median aerodynamic diameter ranging from 1 µm to 5 µm.

In one embodiment, the concentration of solvent remaining in the particles when they are collected (that is, the concentration of residual solvent) is less than 10 wt % based on the total weight of the particles. In another embodiment, the concentration of residual solvent in the particles when they are collected is less than 5 wt %. In yet another embodiment, the concentration of residual solvent in the particles is less than 3 wt %. In another embodiment, a drying process subsequent to the spray-drying process may be used to remove residual solvent from the particles. Exemplary processes include tray drying, fluid-bed drying, vacuum drying, and the drying processes described in WO2006/079921 and WO2008/012617.

Figure 2:
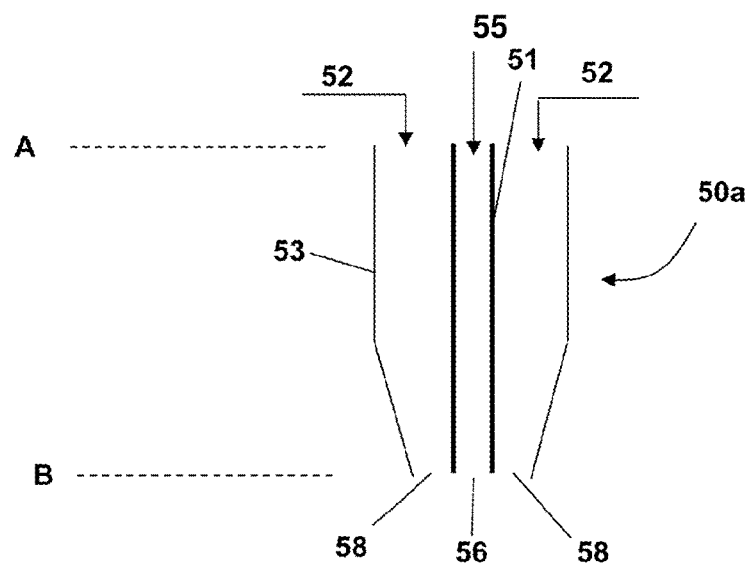
FIG. 2 is a schematic of a flash nozzle, suitable for use in performing the process of the invention.
Figure 3:
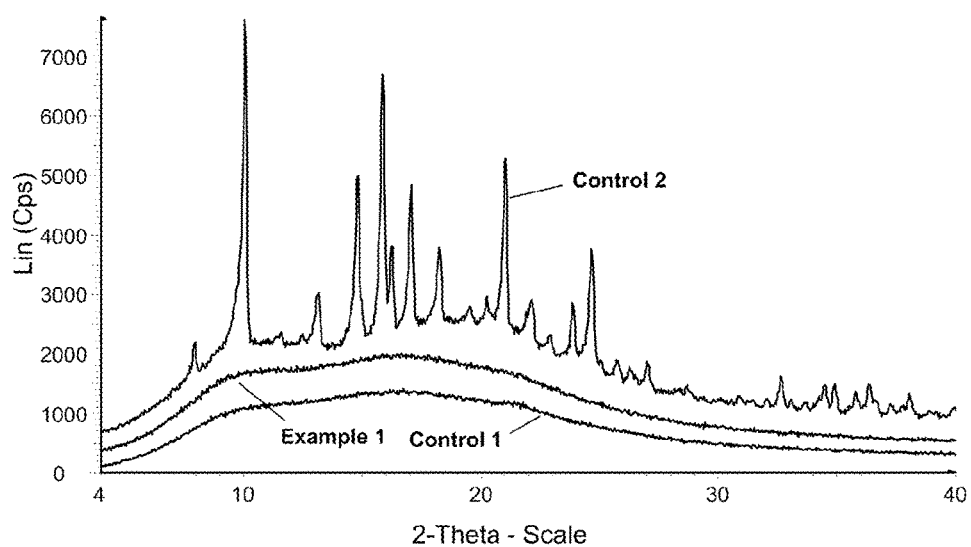
FIG. 3 is a figure showing the results of powder X-ray diffraction of the samples of Example 1, Control 1, and Control 2.

In one embodiment, nozzle 50 is a flash nozzle 50a. There is shown in FIG. 2 a cross-sectional schematic of a flash nozzle 50a. Flash nozzle 50a consists of a central tube 51 and an outer tube 53. Central tube 51 is in fluid communication with the inflowing spray solution 55, while outer tube 53 is in fluid communication with a sweep gas 52. The flash nozzle 50a has an inlet end, represented by A, and an outlet end, represented by B. The spray solution 55 from the heat exchanger 30 (not shown in FIG. 2) enters central tube 51 at A. A sweep gas 52 enters outer tube 53 at A. As spray solution 55 travels through the central tube 51 from inlet A to outlet B, the pressure decreases due to pressure drop. Between the inlet A and outlet B, the pressure of the spray solution 55 decreases to a value that is less than the vapor pressure of the solvent in the spray solution, leading to the formation of vapor bubbles of the solvent (a process known as cavitation). By the time the spray solution 55 reaches outlet B of the central tube 51, it is a fluid 56 comprising droplets of spray solution and vapor-phase solvent. In one embodiment, the central tube 51 is coated with a non-stick coating. In another embodiment, the outer tube 53 is coated with a non-stick coating. In still another embodiment, the central tube 51 and the outer tube 53 are coated with a non-stick coating. Non-stick coatings include, for example, polytetrafluoroethylene (PTFE) or other suitable non-stick coatings.

The sweep gas 52 exiting through the outer tube outlet 58 is in fluid communication with the fluid 56 exiting through the central tube 51. The sweep gas 52 decreases the likelihood that solid material will form at the exit from the central tube 51 or the outer tube 53.

Active Agents

The process of the present invention is used to form a composition comprising an active agent. By "active agent" is meant a drug, medicament, pharmaceutical, therapeutic agent, nutraceutical, agrochemical, fertilizer, pesticide, herbicide, nutrient, or other compound that may be desired to be formulated with a matrix material. The active agent may be a "small molecule," generally having a molecular weight of 2000 Daltons or less. The active agent may also be a "biological active." Biological actives include proteins, antibodies, antibody fragments, peptides, oligoneucleotides, vaccines, and various derivatives of such materials. In one embodiment, the active agent is a small molecule. In another embodiment, the active agent is a biological active. In still another embodiment, the active agent is a mixture of a small molecule and a biological active. In yet another embodiment, the compositions made by certain of the disclosed processes comprise two or more active agents.

The active agent may be highly water soluble, sparingly water soluble, or poorly water soluble. In one embodiment, the active agent is "poorly water soluble," meaning that the active agent has a solubility in water (over the pH range of 6.5 to 7.5 at 25° C.) of less than 5 mg/mL. The active agent may have an even lower aqueous solubility, such as less than about 1 mg/mL, less than about 0.1 mg/mL, and even less than about 0.01 mg/mL.

Matrix Materials

The disclosed processes are used to form compositions comprising a matrix material. Matrix materials suitable for use in the compositions formed by the disclosed methods should be inert, in the sense that they do not chemically react with the active agent in an adverse manner. The matrix material can be neutral or ionizable. In one embodiment, the composition includes two or more matrix materials.

Exemplary matrix materials include polysaccharides. Polysaccharides can be underivatized, such as cellulose, starch, dextran, pullulan, dextrin, maltodextrin, glycogen, inulin, fructan, mannan, chitin, polydextrose, fleximer (a ring-opened form of dextran), and oligosaccharides. Often, derivatives and substituted versions of the polysaccharides are preferred. Examples of such polysaccharide derivatives include ester- and ether-linked derivatives. Included in this class are cellulose ethers, cellulose esters, and cellulose derivatives that have both ester and ether substituents. Specific examples include cellulose acetate, ethyl cellulose, hydroxypropyl methyl cellulose and hydroxyethyl cellulose. Starch derivatives include starch acetate and carboxymethyl starch. Also included are synthetic matrix materials, such as polyacrylates and polymethacrylates, vinyl matrix materials, polyethylenes, polyoxyethylenes, polypropylenes, polyamides, polyesters, polycarbonates, and derivatives and substituted versions thereof; copolymers of various types, including random and block copolymers; other matrix materials such as lactose, trehalose, sucrose, fructose, maltose, dextrose, xylitol, sorbitol, glycine, amino acids, citric acid, phospholipids, bile salts; and mixtures thereof.

In one embodiment, the matrix material is amphiphilic, meaning that the matrix material has hydrophobic and hydrophilic portions. In another embodiment, the matrix material is ionizable.

In yet another embodiment, the matrix material comprises a polymer. Appropriate matrix polymers include polyvinylpyrrolidone, vinyl acetate/vinylpyrrolidone copolymers, vinyl alcohol, vinyl acetate/vinyl alcohol copolymers, hydroxyethyl cellulose, hydroxypropyl methylcellulose, hydroxypropyl methylcellulose phthalate, carboxymethyl cellulose, carboxymethyl ethylcellulose, hydroxypropyl methylcellulose acetate succinate, cellulose acetate phthalate and cellulose acetate trimellitate. In still another embodiment, the matrix material comprises an ionizable cellulosic polymer. In yet another embodiment, the matrix material comprises an amphiphilic, ionizable polymer.

In one embodiment, the matrix material is biodegradable, meaning that the matrix material will degrade over time. By "degrade" is meant that in a use environment, the matrix material is broken down into smaller species that can be absorbed, metabolized, or otherwise eliminated or removed from the environment of use. This degradation can occur through enzymatic, hydrolytic, oxidative, or other reaction, as is well known in the art, or by degrading the matrix material into aqueous soluble species that can readily be removed from the environment of use.

Compositions

In one embodiment, the composition made by the disclosed processes is in the form of a solid amorphous dispersion of the active agent and the matrix material.

In another embodiment, the particles comprise a solid amorphous dispersion of the active agent and matrix material consisting essentially of amorphous active agent molecularly dispersed throughout the matrix material. In this embodiment, the solid dispersion may be considered a "solid solution" of active agent and matrix material. The term "solid solution" includes both thermodynamically stable solid solutions in which the active agent is completely dissolved in the matrix material, as well as homogeneous materials consisting of amorphous active agent molecularly dispersed throughout the matrix material in amounts greater than the solubility of the active agent in the matrix material. A dispersion is considered a "solid solution" when it displays a single glass-transition temperature when analyzed by differential scanning calorimetry (DSC). In one embodiment, the particles have at least one Tg due to the amorphous character of the matrix material. In another embodiment, at least 90 wt % of the active agent in the particles is amorphous. In yet another embodiment, the active agent is amorphous and molecularly dispersed in a portion of one or more of the matrix materials, while the remaining portion of the matrix materials is present as a separate phase. This separate phase matrix material may be amorphous, crystalline, or a mixture of both amorphous and crystalline.

In another embodiment the particles comprise the active agent in crystalline form, which is homogeneously or substantially homogeneously distributed in the matrix material. In still another embodiment, the particles comprise the active agent in amorphous or non-crystalline form, which is homogeneously distributed in the matrix material matrix. In yet another embodiment, the particles comprise a mixture of active agent in crystalline and amorphous forms homogeneously distributed in the matrix material.

In still another embodiment, the particles comprise a mixture of active-agent-rich domains and matrix material-rich domains. The active agent in the domains may be amorphous, crystalline, or a mixture of amorphous and crystalline.

In yet another embodiment, the compositions comprise a third component in addition to the active agent and the matrix material. This third component may be any compound or mixture of compounds that facilitates the intended use of the disclosed compositions. Exemplary third components include, but are not limited to, matrix materials, surface active agents, wetting agents, diluents, fillers, bulking agents, disintegrants, flavors, fragrances, buffering agents, and/or other components known in the art.

Without further elaboration, it is believed that one of ordinary skill in the art can, using the foregoing description, utilize the present invention to its fullest extent. Therefore, the following specific embodiments are to be construed as merely illustrative and not restrictive of the scope of the invention. Those of ordinary skill in the art will understand that variations of the conditions and processes of the following examples can be used.

EXAMPLES

Active Agent 1 was S-(fluoromethyl) 6α,9-difluoro-11β, 17-dihydroxy-16α-methyl-3-oxoandrosta-1,4-diene-17β-carbothioate, 17-propionate, also known as fluticasone propionate, having the structure:

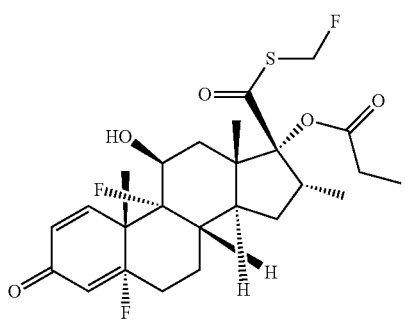

Active Agent 1 has a solubility of 0.4 μg/mL in pH 7.4 buffer, and a Log P value of 3.7. The Tg of amorphous Active Agent 1 was determined by DSC to be 84° C. The room temperature (20° C. to 30° C.) solubility of Active Agent 1 in methanol is 0.3 wt %.

Example 1

A spray-dried dispersion was made using an apparatus similar to that shown in FIG. 1. A feed suspension was prepared by mixing 3 gm of Active Agent 1 and 9 gm of the MG grade of hydroxypropyl methylcellulose acetate succinate (HPMCAS-MG, AQOAT-MG available from Shin Etsu, Tokyo, Japan) with 88 gm of a methanol solvent. The HPMCAS-MG dissolved in the solvent, while the active agent remained in suspension. The feed suspension was maintained at ambient temperature, 20° C. to 30° C., with stirring in a pressure pot to prevent settling of the particles of Active Agent 1. The total solids content of the feed suspension was 12 wt %.

The feed suspension in the pressure pot was pressurized to 245 psig and directed at a rate of 26 gm/min to a tube-in-shell heat exchanger. Heating fluid at 160° C. was circulated in a countercurrent manner through the heat exchanger. The spray solution exiting the heat exchanger was at a temperature, $T_2$, of 120° C., and all of the active agent and matrix material were dissolved in the spray solution. The average residence time of the spray solution in the heat exchanger was less than 60 seconds. The total time the spray solution was at a temperature of 120° C. was less than 80 seconds. Thus, the elapsed time from the time the spray solution exited the heat exchanger to the time it exited the pressure nozzle was 20 seconds. The temperature of the nozzle was 120° C.

The spray solution was delivered to the spray-drying chamber where it was atomized using a Schlick 2.0 pressure nozzle (Düsen-Schlick GmbH of Untersiemau, Germany). The spray solution was atomized into droplets within the spray-drying chamber, while simultaneously mixing the droplets with a nitrogen drying gas which was introduced to the drying chamber at a temperature of 140° C. and at a flow rate of 520 gm/min, resulting in the formation of solid particles.

The solid particles, along with the evaporated solvent and the drying gas, were directed to a cyclone separator, where the solid particles were collected. The particles were subsequently dried in a vacuum chamber at 0.15 atm for 2 to 3 hours to remove residual methanol from the particles.

The resulting particles had 25 wt % Active Agent 1 in HPMCAS-MG.

Control 1

As a control, a 25 wt % Active Agent 1 in HPMCAS-MG composition was made using a conventional ambient-temperature spray-drying process. For Control 1, a feed solution was formed by dissolving 0.45 gm of Active Agent 1 and 1.35 gm of HPMCAS-MG in 179.7 gm methanol. Both the active agent and the matrix material completely dissolved in the methanol at ambient temperature. The total solids content of this solution was 1.0 wt %.

This solution was spray dried using the same apparatus as described for Example 1, except that the heat exchanger was bypassed, such that the spray solution was not heated prior to atomization. All other operating variables were nominally the same as described in Example 1.

Control 2

As a second control, a feed suspension similar to that formed for Example 1 was prepared and then spray dried without heating the spray solution. The feed suspension consisted of 2.25 gm of Active Agent 1, 6.75 gm of HPMCAS-MG, and 66 gm of methanol, resulting in a feed suspension containing 12 wt % solids. Because the feed was a suspension rather than a solution, a two-fluid nozzle was used (manufactured by Spray Systems, Wheaton, Ill.) to avoid clogging.

The feed suspension was spray dried using the same apparatus as described for Example 1, except that the heat exchanger was bypassed, such that the spray solution was not heated prior to atomization, and a two-fluid nozzle was used for atomization of the feed. All other operating variables were nominally the same as described in Example 1.

Analysis of Compositions from Examples 1, Control 1, and Control 2

Samples of the compositions of Example 1, Control 1, and Control 2 were analyzed by powder X-ray diffraction using an AXS D8 Advance PXRD measuring device (Bruker, Inc. of Madison, Wis.). Samples (approximately 100 mg) were packed in Lucite sample cups fitted with Si(511) plates as the bottom of the cup to give no background signal. Samples were spun in the φ plane at a rate of 30 rpm to minimize crystal orientation effects. The x-ray source ($KCu_\alpha$, λ=1.54 Å) was operated at a voltage of 45 kV and a current of 40 mA. Data for each sample were collected over a period of 27 minutes in continuous detector scan mode at a scan speed of 1.8 seconds/step and a step size of 0.04°/step. Diffractograms were collected over the 2θ range of 4° to 40°.

FIG. 3 shows the results of this analysis. The composition of Example 1, made using a concentrated feed suspension and a heat exchanger to increase the feed temperature according to the disclosed processes, showed an amorphous halo, indicating the active agent in the composition was amorphous. Likewise, the composition of Control 1, made using a conventional spray-drying process using a dilute spray solution of active agent and matrix material dissolved in a solvent at ambient temperature, also showed only an amorphous halo. However, the composition of Control 2, made using a concentrated feed suspension but not heated, showed a large number of well-defined peaks, indicating the presence of crystalline active agent in the composition.

This analysis shows that the compositions of Example 1 and Control 1 had similar properties. However, because the spray solution for Example 1 contained 12 wt % solids, while the spray solution for Control 1 only contained 1 wt % solids, certain embodiments of the disclosed processes (Example 1) had a throughput that was 12-fold greater than that of the conventional spray-drying process.

Example 2

A spray-dried dispersion is made using an apparatus similar to that shown in FIG. 1 using the procedures outlined in Example 1, except that the flash nozzle of FIG. 2 is used. The resulting particles consist of 25 wt % Active Agent 1 in HPMCAS.

An embodiment of the disclosed spray-drying processes comprises delivering a spray solution comprising an active agent and a matrix material in an organic solvent to a spray-drying apparatus, atomizing said spray solution into droplets within said spray-drying apparatus via a nozzle to remove at least a portion of the organic solvent from said droplets to form a plurality of particles, wherein said spray solution is delivered to said nozzle at a temperature $T_3$, and collecting said particles, wherein said particles comprise said active agent and said matrix material, and wherein said spray solution is formed by forming a feed suspension comprising said active agent, said matrix material and said organic solvent, wherein said feed suspension is at a temperature $T_1$, and directing said feed suspension to a heat exchanger, thereby increasing the temperature of said feed suspension to a temperature $T_2$, wherein temperature $T_2$ is greater than temperature $T_1$, and said spray solution is at a pressure that is greater than the vapor pressure of said solvent at temperature $T_2$, such that said active agent and said matrix material are soluble in said solvent at temperature $T_2$. In one embodiment, said temperature $T_2$ is greater than the ambient-pressure boiling point of said solvent.

In either of the above embodiments, said active agent and said matrix material may be soluble in said solvent at temperature $T_3$. In any or all of the above embodiments, said spray solution may be atomized using a flash nozzle.

In any or all of the above embodiments, said temperature $T_2$ may be at least 100° C. In any or all of the above embodiments, said spray solution may be at temperature $T_2$ for less than 10 minutes. Alternatively, said spray solution may be at temperature $T_2$ for less than 5 minutes.

In any or all of the above embodiments, said organic solvent is selected from methanol, ethanol, n-propanol, isopropanol, butanol acetone, methyl ethyl ketone, methyl isobutyl ketone, ethyl acetate, propyl acetate, tetrahydrofuran, acetonitrile, methylene chloride, toluene, 1,1,1-trichloroethane, and mixtures thereof. In certain embodiments, said organic solvent is selected from the group consisting of methanol, ethanol, n-propanol, isopropanol, butanol acetone, methyl ethyl ketone, methyl isobutyl ketone, ethyl acetate, propyl acetate, tetrahydrofuran, acetonitrile, methylene chloride, toluene, 1,1,1-trichloroethane, and mixtures thereof. In any or all of the above embodiments, said organic solvent may contain less than 50 wt % water.

In any or all of the above embodiments, said particles may have a mass median aerodynamic diameter ranging from 0.5 µm to 10 µm. In any or all of the above embodiments, said particles may have an average diameter of greater than 10 µm.

In any or all of the above embodiments, said matrix material may comprise a polymer. In some embodiments, said particles comprise a solid amorphous dispersion of said active agent in said polymer.

Also disclosed are embodiments of products made by any or all of the above processes. In some embodiments, the product comprises a solid amorphous dispersion of said active agent and said polymer.

An embodiment of a process for producing a composition comprises forming a feed suspension comprising an active agent, a matrix material and an organic solvent, wherein said feed suspension is at a temperature $T_1$, forming a spray solution by directing said feed suspension to a heat exchanger, thereby increasing the temperature of said feed suspension to a temperature $T_2$, wherein temperature $T_2$ is greater than temperature $T_1$, said spray solution is at a pressure that is greater than the vapor pressure of said solvent at temperature $T_2$, and said active agent and said matrix material are soluble in said solvent at temperature $T_2$, directing said spray solution to a spray-drying apparatus, said spray-drying apparatus comprising a drying chamber, a nozzle for atomizing said spray solution into droplets, and a source of heated drying gas for removing at least a portion of said organic solvent from said droplets, atomizing said spray solution into droplets in said drying chamber by said nozzle, wherein the spray solution is delivered to said nozzle at a temperature $T_3$, contacting said droplets with said heated drying gas to remove at least a portion of said organic solvent from said droplets to form a plurality of particles comprising said active agent and said matrix material, and collecting said particles. In some embodiments, said temperature $T_2$ is greater than the ambient-pressure boiling point of said solvent.

In either of the above embodiments, said active agent and said matrix material may be soluble in said solvent at temperature $T_3$. Alternatively, said active agent or said matrix material may not be soluble in said solvent at temperature $T_3$.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A spray-drying process, comprising:
  (a) forming a feed suspension in a tank at a temperature $T_1$, the feed suspension comprising an active agent, a matrix material, and an organic solvent, wherein the active agent is suspended in the organic solvent, and wherein the organic solvent is methanol, ethanol, n-propanol, isopropanol, butanol, acetone, methyl ethyl ketone, methyl isobutyl ketone, ethyl acetate, propyl acetate, tetrahydrofuran, acetonitrile, methylene chloride, toluene, 1,1,1-trichloroethane, or any mixture thereof, and contains less than 10 wt % water;
  (b) flowing the feed suspension from the tank through a flow-through heat exchanger located downstream of and separate from the tank and upstream of a spray drying apparatus, the flow-through heat exchanger comprising a feed suspension inlet and a spray solution outlet to form a spray solution, wherein the feed suspension entering the feed suspension inlet is at the temperature $T_1$, wherein the temperature $T_1$ is below the ambient-pressure boiling point of the organic solvent and the matrix material is dissolved in the organic solvent at the temperature $T_1$, and the spray solution at the spray solution outlet is at a temperature $T_2$ and at a pressure that is greater than the vapor pressure of the organic solvent at the temperature $T_2$, such that the active agent and the matrix material are soluble in the organic solvent at the temperature $T_2$, wherein $T_2>T_1$,
  (c) directing the spray solution to the spray-drying apparatus via a nozzle positioned proximate the spray solution outlet of the flow-through heat exchanger, wherein the spray solution is delivered to the nozzle at a temperature $T_3$, wherein the temperature $T_3$ is less than or equal to the temperature $T_2$; and (d) atomizing the spray solution into droplets within the spray-drying apparatus through the nozzle to remove at least a portion of the organic solvent from the droplets to form a plurality of particles having an average diameter ranging from 0.5 μm to 500 μm, wherein the particles comprise a homogeneous solid amorphous dispersion of the active agent and the matrix material, wherein the spray solution is at the temperature $T_2$ for less than 5 minutes.

2. The process of claim 1 wherein the organic solvent contains no water and the feed suspension comprises active agent particles suspended in a solution of the matrix material and the organic solvent.

3. The process of claim 1 wherein the temperature $T_1$ is up to 50° C.

4. The process of claim 1 wherein the temperature $T_1$ is ambient temperature.

5. The process of claim 1 wherein the spray solution is at the temperature $T_2$ for less than 80 seconds.

6. The process of claim 1 wherein the active agent and the matrix material are soluble in the organic solvent at the temperature $T_3$.

7. The process of claim 1 wherein the temperature $T_3$ is less than the temperature $T_2$.

8. The process of claim 1 wherein the feed suspension has a residence time in the flow-through heat exchanger of less than one minute.

9. The process of claim 1 wherein the organic solvent contains no water.

10. The process of claim 1 wherein the flow-through heat exchanger is a tube-in-tube device, a tube-in-shell device, a heat exchanger comprising a hot surface over which the feed suspension flows, a microwave device, or an ultrasonic device.

11. The process of claim 1 wherein the active agent has a concentration in the spray solution that is at least 1.25-fold the solubility of the active agent in the organic solvent at the temperature $T_1$.

12. The process of claim 1, further comprising flowing the feed suspension from the tank through a pump which directs the feed suspension into the feed suspension inlet of the flow-through heat exchanger and increases the pressure of the spray solution such that the pressure of the spray solution at the spray solution outlet is greater than the vapor pressure of the organic solvent at the temperature $T_2$.

13. The process of claim 1 wherein the temperature $T_2$ is at least 10° C. greater than $T_A$ where $T_A$ is the temperature at which solubility of the active agent in the organic solvent equals the active agent concentration in the organic solvent.

14. The process of claim 1 wherein the particles have an average diameter ranging from 0.5 μm to 100 μm.

15. The process of claim 1 wherein the matrix material comprises a polymer.

16. The process of claim 15 wherein the particles comprise a solid amorphous dispersion of the active agent in the polymer.

17. The process of claim 1 wherein the plurality of particles comprise the active agent and the matrix material, wherein the active agent has a solubility in water at 25° C. of less than 5 mg/mL.

18. The process of claim 1 wherein the spray-drying apparatus comprises (i) a drying chamber, (ii) the nozzle, and (iii) a source of heated drying gas for removing at least a portion of the organic solvent from the droplets, and wherein the step of atomizing the spray solution into the droplets further comprises contacting the droplets with the heated drying gas to remove at least a portion of the organic solvent from the droplets to form the plurality of particles.

* * * * *